Patented Aug. 29, 1939

2,171,241

UNITED STATES PATENT OFFICE 2,171,241

SILK

Treat Baldwin Johnson, Bethany, Conn., assignor to Textile Foundation, Washington, D. C., a corporation of the District of Columbia No Drawing. Application May 12, 1936, Serial No. 79,403

10 Claims. (Cl. 8—128)

This invention relates to a process for the modification of silk fibres to increase their resistance to deterioration because of the action of light and moisture and to modify their dyeing properties, and to the stabilized product so produced. It relates more particularly to a process by which the various reactive groups, normally present in silk fibroin, such as free tyrocine hydroxyl groups, amino groups, etc., are chemically blocked, without subjecting the silk to the action of any reagent which might cause deterioration of the silk, and includes the modified silk, having increased stability and characteristic dyeing properties.

Silk fibroin possesses a small number of free carboxyl groups and free amino groups, and a relatively large number of free tyrosine hydroxyl groups. Previous workers have claimed that these reactive groups are to a large extent responsible for the deterioration of silk on exposure to light or moisture, and largely control the dyeing properties of the silk because of their influence on such properties as the isoelectric point and the acid and base combining power of the silk.

Accordingly, it is the object of the present invention to provide a method by which these reactive groups in the silk fibroin may be blocked without exposing the fibres to the action of any reagent which might deteriorate them, and with the production of silk fibres with increased resistance to the action of sunlight and moisture, and with characteristic dyeing properties.

In carrying out this process, the silk fibroin, that is, the degummed silk fibres, are exposed, when dry, to the action of a ketene, which reacts with the reactive groups of the fibroin to block them.

Compounds which may be used to modify and stabilize the silk include various ketenes, which have the characteristic

grouping, but preferably ketene, $CH_2:CO$ is used. Diketene, a dimer of ketene,

and similar reactive ketene polymers, may also be used. When silk fibroin is exposed to ketene, the ketene adds directly to the reactive groups, such as free amino or free hydroxyl groups, to acetylate them, and block them. Other ketenes and ketene polymers of course introduce other acyl groups into the silk to block the reactive groups.

The silk, prior to the treatment to stabilize or modify it, is degummed in the usual manner to remove the sericin and is dried. It is then exposed to the ketene while dry, by passing the ketene gas or vapor over the silk, and allowing the silk to remain in an atmosphere of a ketene for several hours. This treatment may be carried out at various temperatures, e. g., at normal temperatures or at temperatures well in excess of 100° C., but preferably it is carried out at normal room temperatures. The extent of the acetylation or acylation, and hence the extent to which the silk is modified and the various reactive groups blocked, may be varied by varying the time of exposure of the silk to the action of the ketene. The exposure of the silk to the action of the ketene should be sufficient to insure the acylation of all of the free tyrosine hydroxyl and amino groups, to insure the absence of these reactive groups in the final product, and to insure the obtaining of a product having increased stability to light and moisture, and improved dyeing properties.

The invention will be further illustrated by the following examples, the first of which shows how a silk fibroin may be acetylated by means of ketene, in a laboratory manner, with comparative analytical results, and the second of which shows a commercial process for the acetylation of silk to block the reactive groups by means of ketene; but it is not limited thereto.

*Example I.*—A sample of good quality yellow Italian silk was degummed to remove the sericin by washing it in a relatively dilute solution of high grade soap at 90 to 100° C. for twenty minutes and rinsing it twice in hot water. The silk was washed three times in this manner. The degummed fibres were soaked for twenty minutes in distilled water at 60° C., pressed free of water, extracted with acetone for ten minutes, and again soaked in distilled water at 60° C. for ten minutes. The silk was again pressed free of water and soaked in acetone, and then extracted with ethyl alcohol for several hours. The excess ethyl alcohol was pressed out, the silk extracted with ether, air-dried and stored in a desiccator.

The air-dried, degummed silk was then exposed to the action of ketene by suspending the silk in a glass chamber connected to a ketene generator, in which ketene was produced by pyrolysis of acetone. The ketene was cooled before entering the chamber in which the silk was suspended. Ketene vapors were passed through the chamber in which the silk was suspended for one hour, and the chamber was then closed and the silk allowed to remain in the atmosphere of ketene for about four hours. This procedure represented one ketene treatment. Various samples of silk were given from one to four treatments of ketene, as shown in the table given below.

Two samples of the silk, instead of being exposed to cooled vapors of ketene, were exposed to the hot vapors of ketene and acetone as they issued from the pyrolysis tube. These samples did not differ substantially from those which were exposed to the cool ketene.

After the samples of fibroin were given the desired number of ketene treatments, they were steeped in cold sodium bicarbonate solution for several minutes. When the evolution of carbon dioxide ceased, and the characteristic odor of ketene disappeared, the treated fibroin was rinsed several times with hot water, extracted with acetone, extracted with ether, dried, and stored in a desiccator.

To ascertain whether the bicarbonate treatment entirely removed adsorbed ketene and acetic acid, one sample was allowed to remain in the sodium bicarbonate solution for fifteen hours at room temperature. It is sample 4 in the table given below. The dried fibres of this sample disintegrated when rubbed gently between the fingers.

The various samples of treated fibroin were then tested by the ninhydrin test for free amino groups, by Millon's test for hydroxylphenyl groups, and for acetyl value. The acetyl value was corrected for the moisture content of the air-dried acetylated silk, and for the blank value obtained with non-acetylated silk. The test used was that described by Kogl and Postowsky in Ann., 440, 34 (1924), and Ann., 459, 268 (1929), using 1:1 phosphoric acid for the hydrolysis step. The results obtained are shown in the following table, which shows that in all of the samples which were subjected to the ketene treatment, the free amino and hydroxyl groups were blocked off, and the acetyl value of the fibroin substantially increased.

| Sample | Ketene treatments | | Millon's test | Ninhydrin test | Percent acetyl value |
|---|---|---|---|---|---|
| | Hot | Cold | | | |
| 0 | 0 | 0 | + | + | 0 |
| 1 | 1 | | − | − | 5.2 |
| 2 | | 2 | − | − | 7.3 |
| 3 | 3 | | − | − | 7.1 |
| 4 | | 4 | − | − | 7.2 |

*Example II.*—A sample of good quality Chinese silk was degummed according to commercial practice by removing the sericin with neutral soap solution of high quality at 90–100° C., freeing the silk from soap by digestion in hot water, washing several times with cold water, and was then dried, after centrifuging, in a vacuum. The dried, degummed silk was air-dried at 215–218° F. and exposed to ketene gas at room temperature in a suitable container for about ten and one-half hours.

The sample so treated gave negative results when tested by the ninhydrin test for free amino groups, and by Millon's test for hydroxyphenyl groups, and had an acetyl value of 9.74%. These samples did not differ substantially from those treated according to Example I, in which the degumming operation was more drastic. In general, an exposure of eight to ten hours of silk degummed according to commercial procedure gives a uniformly acetylated fibroin.

The acetyl value of the various samples of fibroin treated with ketene are somewhat higher than would be expected on the basis of the amount of tyrosine commonly assumed to be present in fibroin, and depends to some extent on the number of treatments to which the fibroin is subjected, the acetyl value of the treated fibroin increasing as the exposure to ketene is increased. The tests nevertheless indicate that in all of the samples the active groups, that is, the free amino groups and free hydroxy groups, were blocked. The high acetyl values obtained may result from reaction of the ketene with other groups than the free tyrosine hydroxyl and amino groups, as the fact that the sample which was soaked in sodium bicarbonate solution for an excessively long time had the same acetyl value as other samples, indicates that the high acetyl values were not due to adsorbed acetic acid or ketene. Another explanation is that we may be dealing here with the action of the dimer of ketene on the silk molecule. This would introduce a blocking group which would break down on hydrolysis with formation of two acid molecules instead of one. It is possible that ketene generated by pyrolysis of acetone is always accompanied with a small quantity of its polymerized modification, the dimer.

The color of the fibroin, when treated with ketene, changed from white to a pale yellow.

The tensile strength of the treated fibres was very slightly lower than the untreated fibres, and the fibrous structure of the silk was not appreciably damaged.

The present invention thus provides a process by which silk fibroin may be modified to change its stability and resistance to the action of light and moisture, and to modify its dyeing properties by acylating the reactive groups normally responsible for the deterioration of silk on exposure to light and moisture and for the dyeing properties of the silk, by exposing the silk fibroin to the action of a ketene, particularly ketene, to acylate the reactive groups.

The invention not only includes this new process, but it also includes the modified and stabilized silk, having increasing stability and resistance to deterioration.

I claim:
1. The process of acylating silk fibroin which comprises exposing the fibroin to a ketene.
2. The process of acetylating silk fibroin which comprises exposing the fibroin to ketene.
3. Silk fibroin acylated by a ketene.
4. Silk fibroin acetylated by ketene.
5. The process of treating silk which comprises degumming the silk, drying it, exposing the degummed and dried silk to the action of a ketene to block its reactive groups, and removing excess ketene.
6. The process of treating silk which comprises degumming the silk, drying it, exposing the degummed and dried silk to the action of ketene to block its reactive groups, and removing excess ketene.
7. The process of treating silk which comprises degumming the silk, drying it, exposing the degummed and dried silk to the action of a ketene to block its reactive groups, and washing in dilute alkali to remove excess ketene.

8. The process of treating silk which comprises degumming the silk, drying it, exposing the degummed and dried silk to the action of ketene to block its reactive groups, and washing in dilute alkali to remove excess ketene.

9. The process of treating silk which comprises degumming the silk, drying it, exposing the degummed and dried silk to the action of a ketene to block its reactive groups, and washing in dilute sodium bicarbonate solution.

10. The process of treating silk which comprises degumming the silk, drying it, exposing the degummed and dried silk to the action of ketene to block its reactive groups, and washing in dilute sodium bicarbonate solution.

TREAT BALDWIN JOHNSON.